Patented Apr. 11, 1939

2,154,318

UNITED STATES PATENT OFFICE 2,154,318

REFRACTORY AND METHOD OF MAKING

Raymond C. Benner and Henry N. Baumann, Jr., Niagara Falls, N. Y., assignors, by mesne assignments, to The Carborundum Company, Niagara Falls, N. Y., a corporation of Delaware No Drawing. Application December 19, 1935, Serial No. 55,197

7 Claims. (Cl. 106—9)

This application relates to improvements in refractories which are cast from a molten mass of crystallizable oxides and to the method of making them.

In such a refractory, it is for many purposes desirable that the size of the individual crystals of which the refractory is composed shall be as large as possible so that the various portions of the piece shall be as firmly knit together as possible. In this way, the action of forces tending toward the mechanical disruption of the casting are most effectively combatted. Cracking and spalling are decreased and the load carrying ability at high temperatures (although adequate for most purposes in any event) is further extended.

Crystal growth is commonly considered to be a result of slow cooling. In the case of crystallizable oxides such as alumina, however, the solidification point is so sharp as to make any control of crystal size through cooling rates almost impossible except in pieces weighing several tons. Hence, other means of producing large crystals have been sought.

When a crystalline oxide or a mixture of oxides which combine to form a single phase by reason of chemical combination such as the spinels, or because they form a solid solution such as chromic oxide and aluminum oxide, are fused and allowed to solidify after being cast, the tendency is to form small, often skeletal crystals in an open, porous structure. If the composition as cast contains an appreciable amount of associated oxides that tend to form a considerable amount of a second phase, either crystalline or amorphous, the primary crystals may be larger and in some cases the interstices between these may be quite well filled with the second or matrix phase. Our object, however, is to have essentially a single crystalline refractory oxide phase in no case containing more than 15% of uncombined accessory oxides and our experiments have indicated that this can be accomplished as set forth below, thus avoiding an excessive amount of fluxes or of otherwise less refractory material.

We have found that it is possible to secure considerably coarser crystallinity by adding to the ingredients in process of fusion a small amount of any of several ingredients which we shall herein refer to as mineralizers. Our use of this term is somewhat akin to but not identical with the usage in geology and mineralogy. In these latter it is usually applied to gases which are considered to have been responsible for the production of a coarse crystalline structure in igneous rocks.

It is possible that whether through some relation to the gases present or otherwise, the effect of mineralizers is to greatly increase the fluidity of the crystallizing melt, or to render the crystal phase more soluble in the matrix or soluble over a wider range of temperatures than it is in the absence of the mineralizer, and thus to increase the period of crystallization so materially as to yield crystals of distinctly larger size than are secured when mineralizers are absent. In any event, such larger crystals result, whatever may be the mechanism, and the structure of the solidified mass is so characterized by irregular scattered pores or vugs as to suggest the presence of a gas phase interspersed through it at the moment of solidification.

In our usage in this application, we shall apply the designation of mineralizers to those solid materials which when incorporated in the melt in small amounts produce this same phenomenon in our castings. Some of these materials develop relatively high vapor pressures at the temperatures required for the fusion of refractory oxides. These vapor pressures may be of the volatilized material itself or may result from its thermal decomposition. It should be noted, however, that materials, the decomposition products of which (or which are themselves) readily reducible by carbon at high temperatures, for example carbonates, reducible oxides, etc., do not appear to be capable of acting as mineralizers. Among other materials which are serviceable are cryolite ($Na_3AlF_6$), boric oxide ($B_2O_3$), fluorspar ($CaF_2$), and magnesium chloride ($MgCl_2.6H_2O$). The halides of the alkaline earths and of aluminum appear to be particularly serviceable mineralizers.

The percentage required is surprisingly small, one per cent by weight usually being ample to produce a very marked difference in crystal structure. Three to five per cent is the upper limit which should be used in this way as the mineralizers are also rather strong fluxes which impair the refractoriness of the composition as a whole if used in larger amounts.

The amount of mineralizer will vary somewhat with the impurities associated with the raw mix, e. g., 1% of boric oxide is all that is required to develop coarse corundum, crystallization in a 99% mix of alumina, while lower grade forms of alumina containing, e. g. only 95% $Al_2O_3$, the remainder being $SiO_2$, $TiO_2$, $Fe_2O_3$, etc., required 3% $B_2O_3$ to furnish a comparable micro-structure.

Each mineralizer produces its own characteristic coarsening effect upon the crystal structure, which is independent of subsequent annealing of the cast article. It was found for example that in small castings made of fused alumina without the addition of a mineralizer the individual crystals were small and often skeletal, measuring 0.15 mm. or less in diameter. With castings of the same size and material, produced in an identical manner, except for the addition of 1% of the various mineralizers to the raw batch, the following results were secured:

(a) 1% cryolite gave crystals averaging 0.5 mm. in diameter, the crystals tending to be equi-dimensional and all being of about the same size.

(b) 1% magnesium chloride gave irregular shaped, parallel, plate-like crystals having an average size of 0.5 to 1.5 mm.

(c) 1% boric oxide produced large elongated crystals with serrated boundaries. Pores were unusually few. The crystal thickness was 1 to 2 mm. and the length 5 mm. or over.

Tests made on these mineralized compositions for resisting the corrosion of molten glasses show that they have superior value for construction of the walls of glass tanks, crucibles and other containers for molten glass. They also possess a high softening point and are excellently adapted for general refractory use.

While in the foregoing examples fused alumina formed the principal bulk of the refractory, similar results (i. e., larger crystals, more solid pieces and better slag resistance) can be secured by the use of mineralizers with cast mullite, spinel (magnesium aluminate), chromite enriched with alumina (as in Patent 2,063,154 and application 109,544 filed November 6, 1936) and the like. The effect appears independent of the particular oxide used.

The fundamental crystalline substance characteristic of the casting remains the same however, regardless of the presence of the mineralizers, i. e., alumina fusions form corundum crystals, mullite fusions form mullite crystals, etc. It is therefore our hypothesis that the presence of the mineralizers and/or the gases therefrom affects the conditions in the melt at the time of solidification in a beneficial way which we do not fully understand, but that these substances do not permanently combine with the inherent ingredients in such a way as to form different crystalline phases. It is perhaps a question of relative solubilities in the molten magma remaining during solidification, or of altered magma viscosity or some other factor. In any event, the results are as described.

In carrying out the manufacture of cast refractories, we fuse the major ingredients (such as bauxite, clay, etc.) in the manner familiar to all makers of fused alumina abrasives, using an arc furnace, and reducing out any undesired impurities. A few minutes before the bath is to be cast, we add the required amount of mineralizer, together with some further charge of the main ingredient. Mixing is accomplished by the normal swirling and boiling of the fused mass in the furnace, so that within a very few minutes the charge of mineralizer is well distributed through even a large fusion. The molten material is then cast into molds made of metal or of granular refractory material, having suitable risers in the manner familiar in the art of casting molten oxides to form refractories, and are then cooled slowly enough to prevent cracking. It is also possible to initially mix the mineralizer with the main mass of material before fusion, although the method described is recommended.

In addition to this utilization in cast refractories, we find that the structure of pellets made by blowing a stream of molten material with compressed air is strengthened by incorporation of a mineralizer in the melt.

While we have mentioned only a few mineralizers, it is understood that the use of certain equivalent materials may fall within the description of this invention. This applies in particular to the halide group, and also to boric oxide containing compounds such as borax, colemanite, etc., which at the temperature of casting refractory oxides would have a considerable vapor pressure.

As is customary in connection with refractories, the word "aluminous" in this specification and in the appended claims is used in a sense differing from the more general dictionary usage in which it signifies any compound or mixture comprising aluminum in any form. In our usage here the word signifies that the body under discussion is composed essentially of homogeneous crystal-forming refractory substances, in which alumina is the major constituent, and in the appended claims the term "aluminous" is meant to cover only any member of the group consisting of alumina itself, magnesium aluminate, mullite, or chromite-alumina crystals.

We claim:

1. The process of making fused cast refractories which comprises incorporating in a bath of molten alumina a mineralizer composed of a halide of an alkaline earth metal in an amount of approximately 1%.

2. A refractory aluminous casting characterized by a relatively coarse crystalline structure of the type produced by incorporation of $CaF_2$ in the fusion from which it is cast, the $CaF_2$ constituting not over 5% by weight of the fusion.

3. A refractory casting composed substantially of alumina and having the structure resulting from the presence in the melt from which it is cast of 1 to 3% of $CaF_2$.

4. A refractory casting composed of aluminous material, said casting being characterized by a relatively coarse crystalline structure of the type produced by the incorporation of a halide of an alkaline earth metal in the fusion from which the casting is poured, said halide constituting not over 5% by weight of the fusion.

5. A refractory alumina casting characterized by a relatively coarse crystalline structure of the type produced by incorporation of an alkaline earth halide in the fusion from which it is cast, said halide constituting not over 5% by weight of the fusion.

6. A refractory casting composed of aluminous material, said casting being characterized by a relatively coarse crystalline structure of the type produced by the incorporation of a member of the group consisting of halides of alkaline earth metals, halides of aluminum, and boric oxide containing compounds as a mineralizer in the fusion from which the casting is poured, said mineralizer constituting not over 5% by weight of the fusion.

7. A refractory casting composed of aluminous material, said casting being characterized by a relatively coarse crystalline structure of the type produced by the incorporation of a member of the group consisting of boric oxide containing and halogen-containing compounds as a mineralizer in the fusion from which the casting is poured, said mineralizer constituting not over 5% by weight of the fusion.

RAYMOND C. BENNER.
HENRY N. BAUMANN, Jr.